United States Patent [19]

Gogins et al.

[11] Patent Number: 4,647,462

[45] Date of Patent: Mar. 3, 1987

[54] FROZEN CAULIFLOWER PRODUCT AND TREATMENT METHOD

[75] Inventors: Katharina A. Z. Gogins, Roseville; David J. Smith, LeSueur, both of Minn.

[73] Assignee: The Pillsbury Company, Minneapolis, Minn.

[21] Appl. No.: 714,062

[22] Filed: Mar. 20, 1985

Related U.S. Application Data

[63] Continuation of Ser. No. 499,568, May 31, 1983, abandoned.

[51] Int. Cl.[4] .......................... A23B 7/00; A23L 1/272
[52] U.S. Cl. .................................... 426/270; 426/321; 426/524; 426/615
[58] Field of Search ............... 426/270, 321, 615, 654, 426/524

[56] References Cited

FOREIGN PATENT DOCUMENTS 46-13661  4/1971  Japan ..................... 426/654
1510883  5/1978  United Kingdom .

Primary Examiner—George Yeung
Attorney, Agent, or Firm—Robert J. Lewis; Mart C. Mathews

[57] ABSTRACT

A frozen cauliflower product containing a concentration of sodium acid pyrophosphate (hereinafter refered to as "SAPP") of at least about 0.07% by weight, the primary purpose of which is to prevent discoloration but with the additional advantage of stabilizing the texture and also the taste properties of the frozen cauliflower pieces during frozen storage. The method for treating the cauliflower includes adding the SAPP during the preparation of the cauliflower for the freezing step of the process.

13 Claims, 2 Drawing Figures

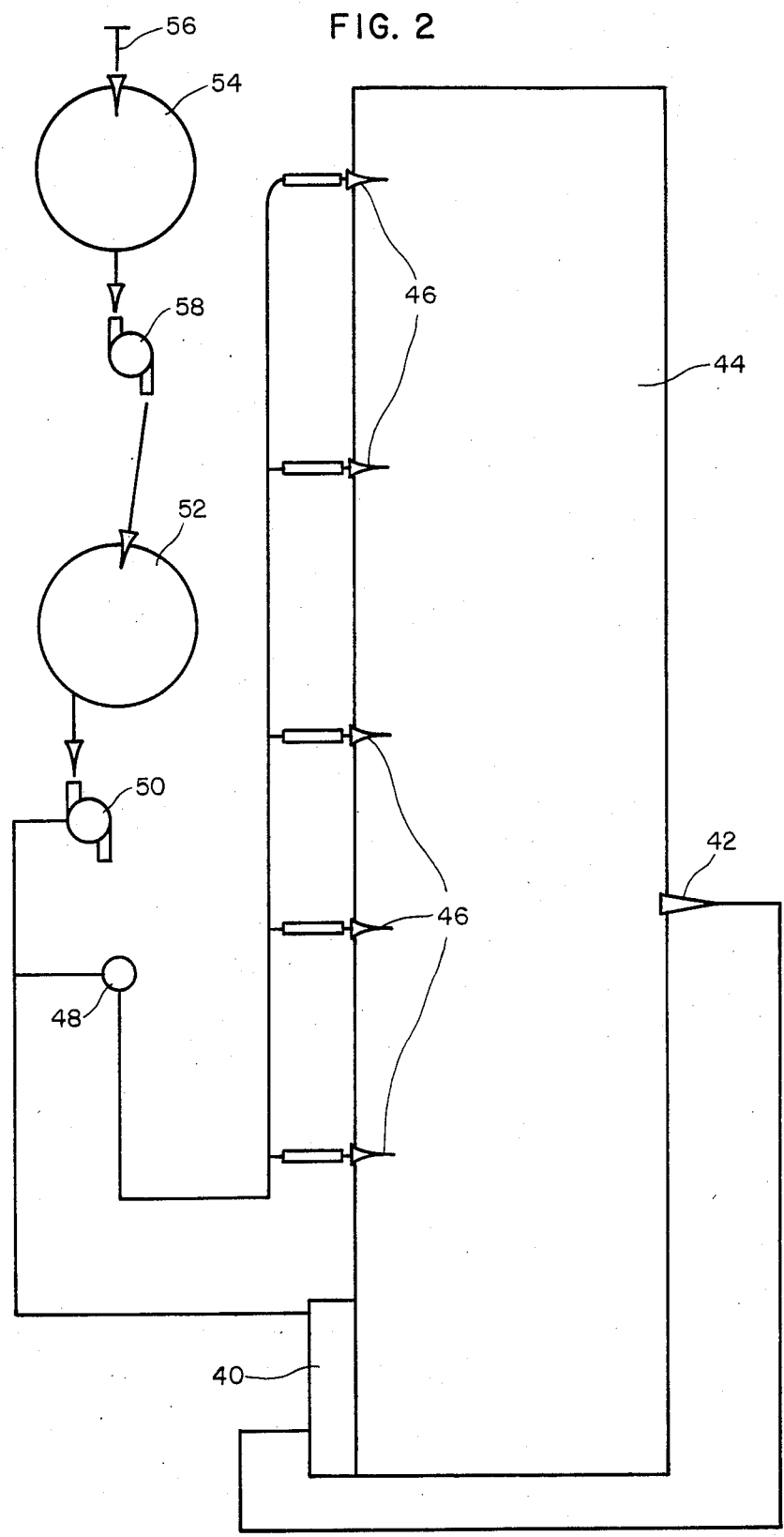

FROZEN CAULIFLOWER PRODUCT AND TREATMENT METHOD

This is a continuation of application Ser. No. 499,568, filed May 31, 1983, now abandoned.

BACKGROUND OF THE INVENTION

Processors of frozen cauliflower have had serious problems with discoloration of the product during normal periods and temperatures of frozen storage. To a lesser extent, problems have also occurred in softening of the texture and even the taste. These quality changes during storage of frozen cauliflower have been well known for many years. The Time-Temperature Tolerance of the Frozen Foods industry project at the Western Regional Research Laboratory of the United States Department of Agriculture, studied the discoloration and also the taste problems. The study results are reported in the October, 1962 article by W. C. Dietrich, M-D. F. Nutting, M. M. Boggs and N. E. Weinstein entitled "Time-Temperature Tolerance of Frozen Foods. XXIV. Quality Change in Cauliflower" in FOOD TECHNOLOGY 24:123-128, and also in the book entitled *The Freezing Preservations of Foods*, published in 1968 by AVI Publishing Company of Westport, Conn. These publications clearly establish that the rates of quality deterioration increase exponentially with rises in storage temperature within the range of 0° F. to 25° F. An approximate "rule of thumb" pointed out in the publications is that for each 10° rise in storage temperature within the 0° F. and 25° F. range, the deterioration increased approximately 4-fold. The above referenced 1968 publication reports that discoloration occurs 3.6 times faster at 10° F. than at 0° F., and 10.7 times faster at 20° F. than at 0° F. The tests with industry panelists reported in the 1962 FOOD TECHNOLOGY article identified above establish that the product is not of high quality after storage from between 3 to 6 months at 10° F. and after only 5 to 11 weeks at 20° F. The results clearly demonstrate that color is significantly less stable than is flavor; however, perceptible flavor changes were demonstrated within 10, 2 and even 0.5 months for 0° F., 10° F., and 20° F. storage temperatures, respectively. On the other hand, color changes were observed within even shorter storage times, to-wit: 2, 0.5 and 0.2 months at storage termperatures of 0° F., 10° F., and 20° F., respectively. In summary cauliflower quality undergoes substantial deterioration within only relatively short periods of frozen storage and color is the least stable quality. Also, the rate of quality deterioration of the cauliflower increases very substantially with increases in storage temperature. Since specified temperatures are extremely difficult to maintain, particularly during the distribution and display of frozen food products, the problem of quality deterioration in the marketplace is very serious and has remained unsolved in the industry for over 20 years.

Consumer marketing tests also establish that the color of the cauliflower is very important to the consumer and discoloration of frozen cauliflower produces substantial consumer resistance.

A number of different chemical treatments of the cauliflower were examined primarily to determine and evaluate the effectivness for preserving the color of the frozen cauliflower under normal storage, distribution and marketing conditions. Such chemicals as citric acid, malic acid, ethylenediamine tetraacetic acid and ascorbic acid, were added to the cauliflower without appreciable beneficial effects on the preservation of the white color. The only chemical additive that has proved to be effective is sodium acid pyrophosphate (SAPP) and the minimum percentage of SAPP in the cauliflower which has proven to be effective is 0.07% by weight unless otherwise specified all per cents are by weight.

U.S. Pat. No. 4,097,612 issued June 27, 1978, which corresponds to Canadian Patent No. 999,479 and also relates generally to British Patent No. 1,510,883, are all assigned to Creston Valley Foods, Inc. of Vancouver, B.C., Canada. The U.S. and Canadian patents disclose the use of SAPP in connection with the high-temperature retort processing of potatoes (up to 250° F. for approximately 1 hour for a 1-pound package), and includes the use of SAPP in the blanching operation of the 3-step retort process along with other chemicals. The British Patent No. 1,510,883 refers to other vegetables including cauliflower in addition to potatoes. The use of SAPP alone in the retort process, without the other chemicals, is ineffective to prevent discoloration of the cauliflower. It is believed that the retort cauliflower browning process involves a different chemical mechanism than is involved in the frozen storage browning process. The problem applicants have solved is the preserving of the frozen cauliflower product; frozen storage does not involve the retort process in any way.

SUMMARY OF THE INVENTION

The present invention resides in producing a frozen cauliflower product which contains a concentration of SAPP of greater than about 0.07% by weight of frozen cauliflower, and the invention provides an extremely versatile, easily-controlled solution to the problem by adding the SAPP to the cauliflower pieces during any one of a number of the steps carried out during the processing and freezing of the cauliflower. Frozen cauliflower which contains more than this minimum concentration of SAPP has very substantially improved storage capabilities. These capabilities include enhancement and stabilization of color, fresh cauliflower flavor, and firm texture of the frozen cauliflower during frozen storage.

The invention also resides in the method of treating the cauliflower which includes wetting the cauliflower, after the same has been graded for size, in a solution containing at least 1.0% SAPP by weight. The wetting time and SAPP concentration of the solution can be adjusted to insure sufficient SAPP penetration to produce a concentration level in the cauliflower of greater than about 0.07% after processing.

During normal cauliflower freezing processing, the cauliflower pieces are graded as to size, ranging from approximately ½ to ¾ of an inch up to a maximum of 2½ to 3 inches. The SAPP may be introduced into the cauliflower during one or more of the numerous stages of preparation of the pieces of cauliflower for freezing.

DESCRIPTION OF THE DRAWING

FIG. 2 is a diagrammatic view of a typical treatment system and apparatus

DETAILED DESCRIPTION OF THE INVENTION

Figure 1:
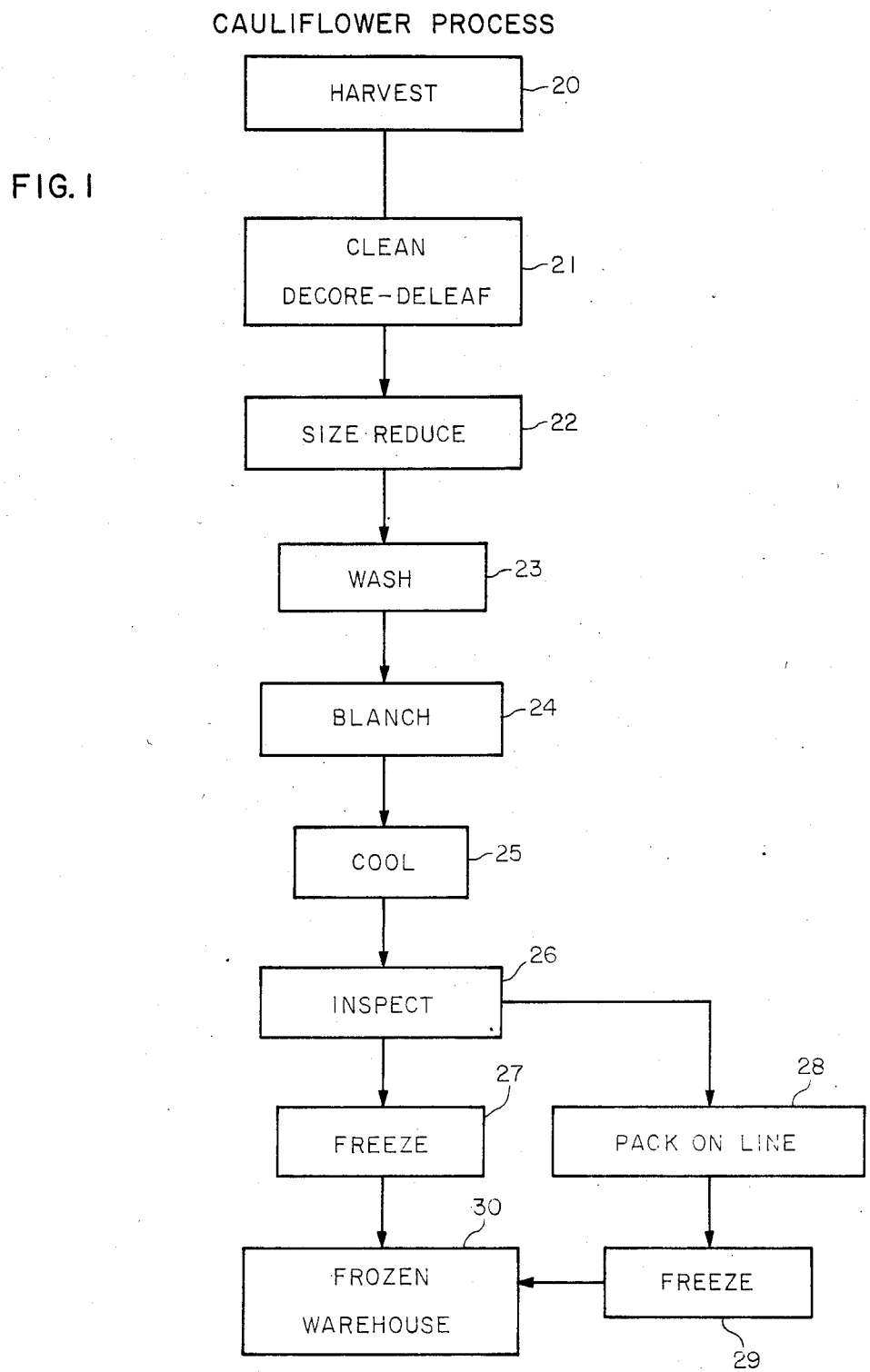
FIG. 1 is a block diagram showing the various stages in processing cauliflower from the harvesting to the final freezing and warehousing stage.

Frozen cauliflower is packaged in a number of different size categories. The larger sizes require more dwell time in the blanching step of the preparation process than do the smaller sizes. Since the penetration of the SAPP into the cauliflower appears to be related to the exposure time of the cauliflower pieces to the SAPP-containing solution, the concentration of SAPP in the processing solution must be varied according to the size of the cauliflower pieces being processed, so that the exposure time in the blanching operation can be adjusted to produce the desired texture properties while still producing the desired SAPP penetration for color, texture and taste stability.

FIG. 1 shows a box diagram of a typical frozen cauliflower processing line. The SAPP can be conveniently added to the cauliflower prior to freezing. For example, the SAPP can be added in the blanch operation, and in a cooling tank after the blanch operation, as well as in the brine of a packaged-in-brine package. The SAPP could also be sprayed onto the cauliflower if desired.

The following is a brief description of the general operations shown in the flow chart. After the cauliflower is harvested as represented by the harvest block 20 in the diagram, it is cleaned, decored and deleafed as depicted by the block 21. The cauliflower pieces are then reduced in size as represented by the size reduce block 22 of the flow chart and the washing operation is represented by the wash block 23 of the diagram. The block 24 represents the blanching operation and block 25 represents the cooling operation. The cauliflower is then inspected as indicated by block 26 and may then be delivered to a freezer 27 or to a packaging operation 28 prior to the freezing step 29. After the freezing operation, the cauliflower is delivered to a frozen product storage warehouse 30 and from there, is delivered to the market while maintaining the temperature as close to the prescribed 0° F. temperature as possible. Since the most rapid change in the cauliflower constitutes its discoloration, the initial tests related to a number of different SAPP concentrations and selected periods of frozen storage. In order to accelerate the test procedures in view of the rapid deterioration of frozen cauliflower at higher storage temperatures, the tests were run at a selected 20° F. These tests clearly establish that at least about 0.07% (in the frozen state) weight-to-weight concentration of the SAPP in the cauliflower is required to produce the desired anti-deterioration effects. A preferred range for SAPP concentration is between 0.08% and 0.21%, and better results are obtained if the percentage is maintained at between 0.10% and 0.16%, with the best results being obtained with a concentration of between 0.10% and 0.14%.

Our tests establish that the SAPP can be effectively added during the processing of the cauliflower prior to freezing. For example, the SAPP may be added in the blanch tank during the blanching operation. If the concentraton of SAPP in the blanch water is maintained above 1.0%, sufficient absorption occurs to produce the desired anti-browning, and the beneficial flavor and texture effects on the cauliflower pieces. Under the above conditions, the concentration of the SAPP in the cauliflower produced by a concentration of SAPP in the blanch water of at least 1% has proved to be satisfactory; however, a SAPP concentration of between 1.4% and 3.5% is preferred, and a concentration in the blanch water of between 2% and 3.2% is most preferred to produce a SAPP concentration in the cauliflower of approximately 0.12%.

If the SAPP is added in the cooling operation after the completion of the blanching operation, the SAPP concentration in the dip tank water should be greater than 1.0%. If the SAPP concentration in the dip water is maintained at between 1.4% and 1.9%, better results are obtained, and if the SAPP concentration is maintained at 1.9%, the best results are obtained.

In addition to treating the cauliflower in the blanching tank and in the cooling dip tank, SAPP has been effectively added to the cauliflower by adding it to the brine solution in which cauliflower may be packaged. When the brine-to-cauliflower precentage is approximately 20%, the concentration of SAPP on the brine solution should be greater than 0.9% to produce satisfactory color, texture and taste protection.

Sensory tests were run on cauliflower blanched in a solution containing between about 1.5% and about 2.65% SAPP where the blanch temperature was maintained at between 190° F. and 210° F. and the dwell time in the blanch water was maintained at between 3 and 5 minutes. These conditions in the blancher produced a concentration in the cauliflower of approximately 0.10% and about 0.15% SAPP. This cauliflower containing between about 0.10% and about 0.15% SAPP was stored at 20° F. for 26 weeks along with a control batch of untreated cauliflower and a second control batch of untreated cauliflower which was stored at −40° F. as a constant quality control. Several test panels were used to compare the sensory test categories of color, flavor and firmness for cauliflower test samples stored for a 26-week period. The tests showed no significant difference in any of the categories between the treated cauliflower containing between about 0.10% and about 0.15% SAPP and the constant quality control sample stored at −40° F. The tests also showed that there was significant quality deterioration of the untreated cauliflower sample when compared with the treated sample and the constant quality control sample. The SAPP treated cauliflower samples were significantly firmer than the untreated samples and maintained the fresh cauliflower flavor better than the untreated samples.

Two different varieties of cauliflower were used in the testing program. These are varieties known as Monarch 73 and Selection 123. For these two varieties, the minimum percentage of SAPP required to produce the desired stabilizing effects remained generally similar and the data set forth above applies to both varieties tested.

We discovered that the percentage of SAPP in the cauliflower treatment solution varies in direct relationship to the pH of the solution. Addition of SAPP to the solution serves to reduce the pH and, therefore, the specific pH readings will represent the concentration of SAPP in the solution. Therefore, the concentration of the SAPP in the cauliflower may be controlled by controlling the pH of the solution controlling the quantity of SAPP introduced into the solution. Some minerals in the water supply affect the influence of the SAPP to pH relationship. Also, the cauliflower serves as a pH buffering agent. Therefore, in order to control the percentage of SAPP in the water, the SAPP control mechanism must be calibrated for each installation. The actual control mechanism is a device purchased from Leads and Northrup of North Wales, Pa., 19454, and is identified by Model No. 7083 microprocessor pH analyzer.

A control system embodying the Leads and Northrup pH analyzer is illustrated diagrammatically in FIG. 2 where the microprocessor pH analyzer is designated by the numeral 40 and is responsive to the pH sensor electrode probe 42 mounted in the tank 44 in which the cauliflower is being treated. As stated previously, this can be a blanch water tank or a cooling dip tank or may be done in a separate SAPP treating process. In the form shown, a plurality of ball valve controlled SAPP injector nozzles 46 is provided for injecting SAPP at different locations within the treatment tank 44 and a suitable solonoid control valve 48 is provided for controlling the injection of the SAPP from a supply pump 50 which receives SAPP from the holding tank 52. A mixing tank 54 receives water from a suitable supply conduit 56 and supplies the mixed SAPP to the holding tank 52 by means of a transfer pump 58.

It is to be understood that while there has been illustrated and described certain forms of the present invention, the invention is not to be limited to the specific form or arrangement of parts herein described and shown except to the extent that such limitations are found in the claims.

What is claimed is:

1. A frozen non-retorted cauliflower product which contains at least about 0.07% by weight concentration of SAPP (sodium acid pyrophosphate) therein.

2. The frozen cauliflower product set forth in claim 1 wherein the percentage of SAPP contained therein is between about 0.08% and 0.21%.

3. The product set forth in claim 1 wherein the percentage of SAPP contained therein is between 0.10% and 0.16%.

4. The product set forth in claim 1 wherein the concentration of SAPP contained therein is between about 0.10% and 0.14%.

5. The method of introducing SAPP (sodium acid pyrophosphate) in non-retorted cauliflower for stabilizing the color of frozen cauliflower, said method comprising, processing cauliflower pieces including:

the processing step of blanching the cauliflower pieces, the processing step of cooling the blanched product, and adding SAPP to the cauliflower prior to freezing to produce cauliflower containing at least about 0.07% by weight SAPP; and freezing said cauliflower.

6. The method set forth in claim 5 wherein the step of adding the SAPP to the cauliflower is performed during one of the processing steps.

7. The method set forth in claim 5 wherein the SAPP is added during the blanching step and the concentration of SAPP in the blanch solution is greater than about 1%.

8. The method set forth in claim 7 wherein the concentration of SAPP in the blanch solution is between about 1.4% and 3.5%.

9. The method set forth in claim 8 wherein the concentration of SAPP in the blanch solution is between about 2.0% and 3.2%.

10. The method set forth in claim 5 wherein the SAPP is added during the cooling step and the concentatin of SAPP in said cooling solution is greater than about 1.0%.

11. The method set forth in claim 10 wherein the concentration of SAPP in the cooling solution is between about 1.4% and 1.9%.

12. The method set forth in claim 10 wherein the concentration of SAPP in the cooling solution is maintained at about 1.9%.

13. The method set forth in claim 5 wherein the SAPP is added by submerging the cauliflower in a solution confined within a tank, sensing the concentration of the SAPP in the solution by sensing the pH of the solution, and introducing SAPP into the solution to maintain the pH of the solution within selected predetermined levels.

* * * * *